United States Patent [19]
Dandurand

[11] Patent Number: 5,233,793
[45] Date of Patent: Aug. 10, 1993

[54] KNIFE SHARPENING CUTTING BOARD

[76] Inventor: Kim A. Dandurand, P.O. Box 1467, Sandpoint, Id. 83864

[21] Appl. No.: 877,611

[22] Filed: May 1, 1992

[51] Int. Cl.⁵ .......................... B24B 3/00; A47J 43/00
[52] U.S. Cl. ..................... 51/181 R; 7/110; 7/170
[58] Field of Search ................... 76/84, 86, 87, 88, 89; 7/170, 110, 158; 51/80 BS, 74 BS, 76 BS, 81 BS, 82 BS, 84 BS, 181 R

[56] References Cited
U.S. PATENT DOCUMENTS

| | | | |
|---|---|---|---|
| 2,495,814 | 1/1950 | Marcantonio | 76/87 |
| 2,520,279 | 8/1950 | Gallo | 76/87 |
| 2,707,852 | 5/1955 | Fillweber | 76/87 |
| 3,758,993 | 9/1973 | Kirtz | 51/80 BS |

FOREIGN PATENT DOCUMENTS 2038614  1/1979  United Kingdom .

OTHER PUBLICATIONS

Birchlite Industries, Inc. Brochure, "Cutting Boards of Distinction."

Primary Examiner—Bruce M. Kisliuk
Assistant Examiner—Bo Bounkong
Attorney, Agent, or Firm—Wells, St. John, Roberts, Gregory & Matkin

[57] ABSTRACT

A knife sharpening cutting board is disclosed in which a cutting board is provided with a recess along a peripheral edge and with intersecting pairs of knife sharpening disks mounted within the recess and rotatably secured to the cutting board for selective rotation about axes that are substantially parallel to one another and to the surface of the cutting board. The disks overlap one another radially to form an intersection that is adjacent to the top cutting surface of the board, and aligned with a groove formed in the board. The groove extends from the sharpening disks across the board to receive a knife blade as the knife is drawn across the sharpening disks. The recess is provided to receive the disks and to locate the disks within the board for protection and appearance purposes. Screws mounting the disks within the recess are accessible to facilitate disk removal.

8 Claims, 5 Drawing Sheets

5,233,793

KNIFE SHARPENING CUTTING BOARD

TECHNICAL FIELD

The present invention relates to a cutting board incorporating integral knife sharpening features.

BACKGROUND OF THE INVENTION

Cutting boards are utilized for a great number of activities in a kitchen, most of which involve the use of a sharp knife. Typically, kitchen knives are used with cutting boards and, for best results should be maintained with extremely sharp cutting edges. Most food cutting processes quickly dull the cutting edges of kitchen knives, thereby necessitating periodic sharpening before continued use.

Many forms of tools have been available for sharpening kitchen knives. These tools are often independent of other functions, unless incorporated with an unrelated apparatus such as can openers.

A cutting process involving cutting board and cutting knife may continue until the knife becomes dull, at which time the user must locate a knife sharpener, sharpen the knife and return the sharpener to the storage place before continuing the cutting operation. This becomes even more tedious when, as usual, the sharpening tool becomes displaced and the user must sort through various items, usually in a miscellaneous storage drawer, to find the sharpener.

The present invention eliminates the need to seek out a sharpening device each time a cutting board is to be used, by combining the cutting board and sharpening device in an efficient economical manner.

It is therefore an object of the present invention to provide a knife sharpening cutting board in which a portion of the board may be used for general cutting purposes, and with provisions on the board for knife sharpening purposes.

A further object is to provide a knife sharpening cutting board in which the cutting board includes specific provisions for mounting the knife sharpening device in an unobtrusive, easily utilized position.

These and still further objects and advantages will become apparent upon reading the following description which, taken with the accompanying drawings, exemplify a preferred form of the present invention.

BRIEF DESCRIPTION OF THE DRAWINGS

A preferred embodiment of the invention is described below with reference to the accompanying drawings, which are briefly described below.

FIG. 7 is a perspective view of the first preferred form of knife sharpening cutting board in use to sharpen a knife.

DETAILED DESCRIPTION OF THE PREFERRED EMBODIMENTS

Figure 1:
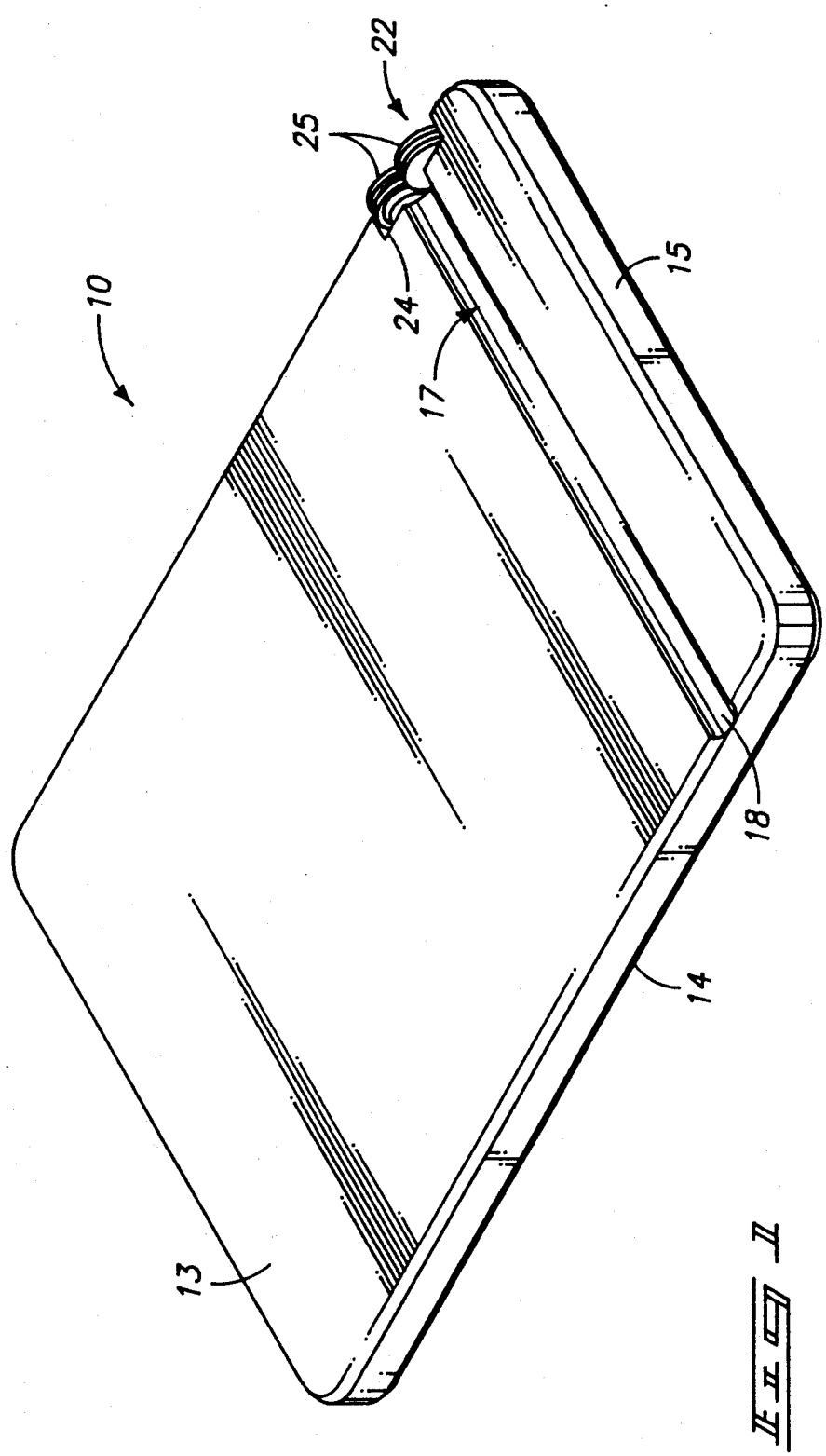
FIG. 1 is a perspective view of a first preferred form of the present knife sharpening cutting board.

This disclosure of the invention is submitted in furtherance of the constitutional purposes of the U.S. Patent Laws "to promote the progress of science and useful arts" (Article 1, Section 8).

A knife sharpening cutting board exemplifying features of a first preferred form of the present invention is generally designated in the accompanying drawings by the referenced numeral 10.

The flat, cutting support surfaces of the board 10 may be constructed of any conventionally used cutting board materials such as wood, plastic, marble, etc. The general configuration of the board is also variable depending upon the desired ornamental affect desired in the board, or its size. The board might also be incorporated in a counter top, drawer, or other appropriate arrangement. It should thus be understood that a wide variety of configurations, dimensions, and materials may be utilized for the cutting board 10.

The cutting board 10 includes opposed top and bottom surfaces 13, 14 separated by a thickness dimension and joined by a peripheral edge surface 15. The top and bottom surfaces 13, 14 are preferably substantially planar and parallel to one another.

The preferred board 10 includes a groove 17 formed into the top surface 13 for receiving the edge of a knife (FIG. 7) and extends from the peripheral edge 15 across the surface thereof. The groove 17 is formed by a concave surface 18 (FIG. 4) into the thickness of the board.

Groove 17 is provided to receive a knife blade 20, and for that purpose, is preferably approximately 3.6 mm in depth with respect to the top board surface 13. A groove having this depth dimension is preferred to facilitate reception of a blade during the sharpening procedures. The groove 17, at this depth, also facilitates positioning of a sharpening means 22 at a low profile elevation with respect to the top surface of the board. This is important for protection of the sharpening elements, and to enhance the overall appearance of the board.

Figure 2:
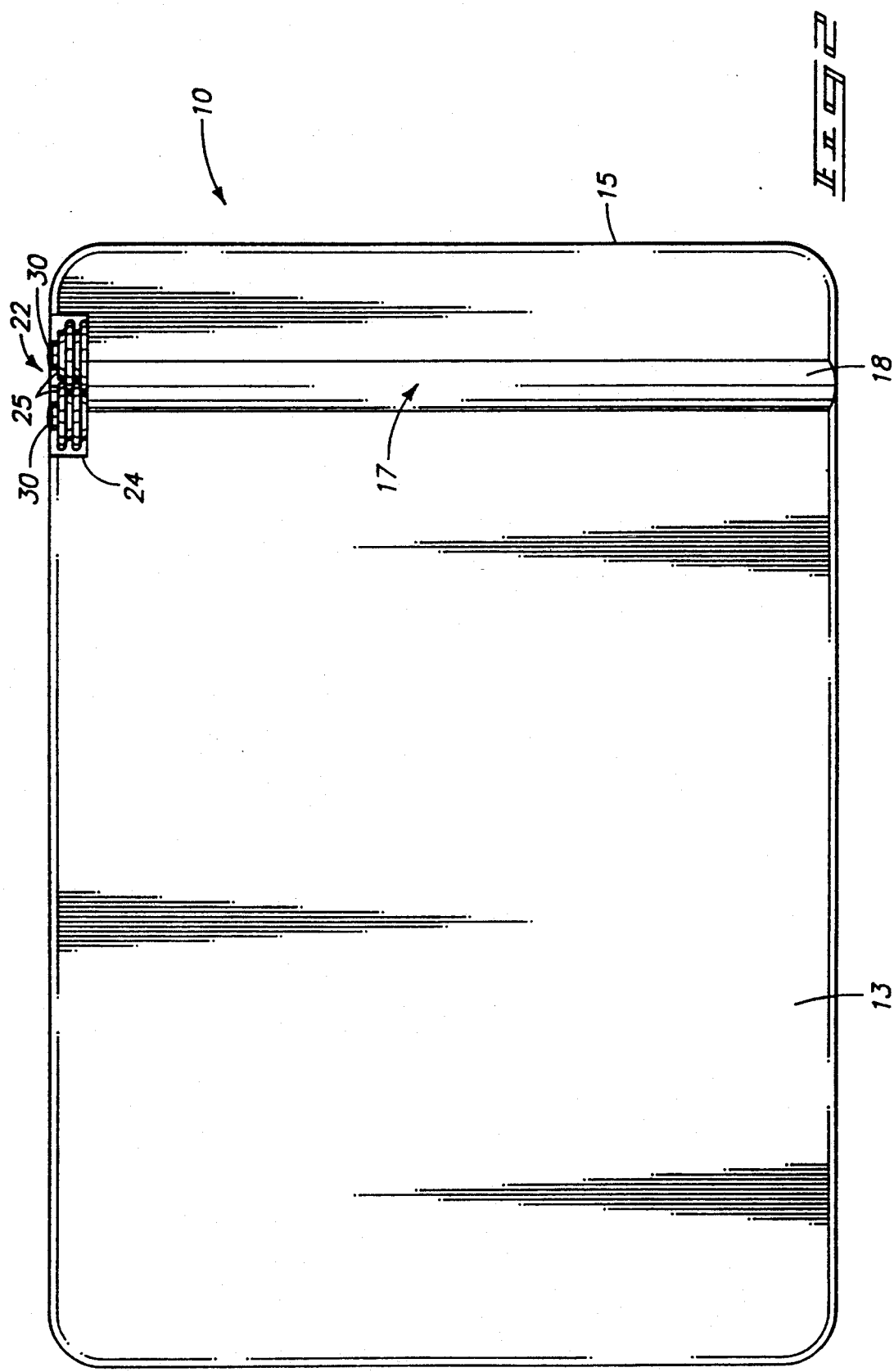
FIG. 2 is a top plan view on a slightly enlarged scale than that shown in FIG. 1.
Figure 4:
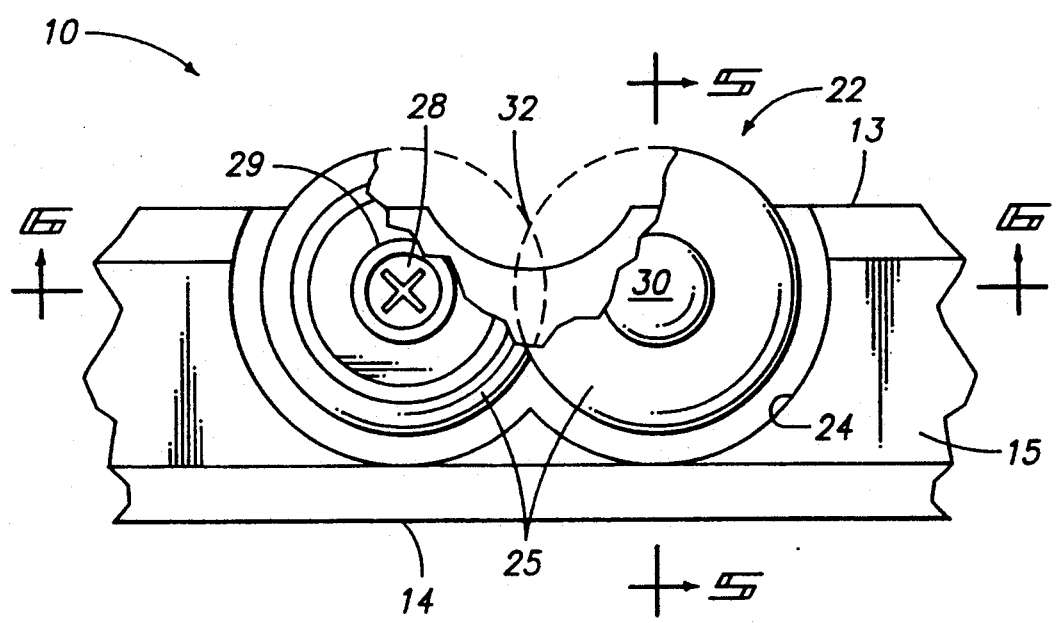
FIG. 4 is a further enlarged fragmented view showing portions of the knife sharpening disks broken away and the relationship of the intersection point of the disks with respect to a groove formed in the board.
Figure 5:
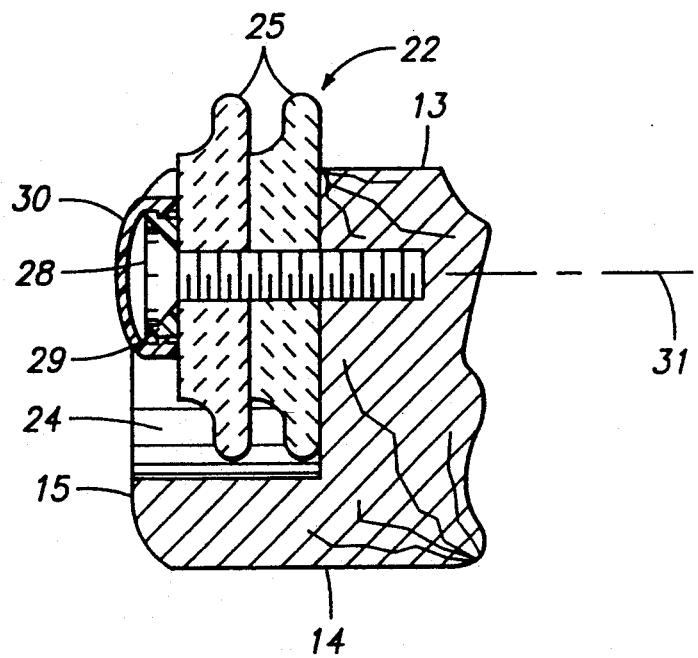
FIG. 5 is an enlarged sectional view taken along line 5—5 in FIG. 4.
Figure 6:
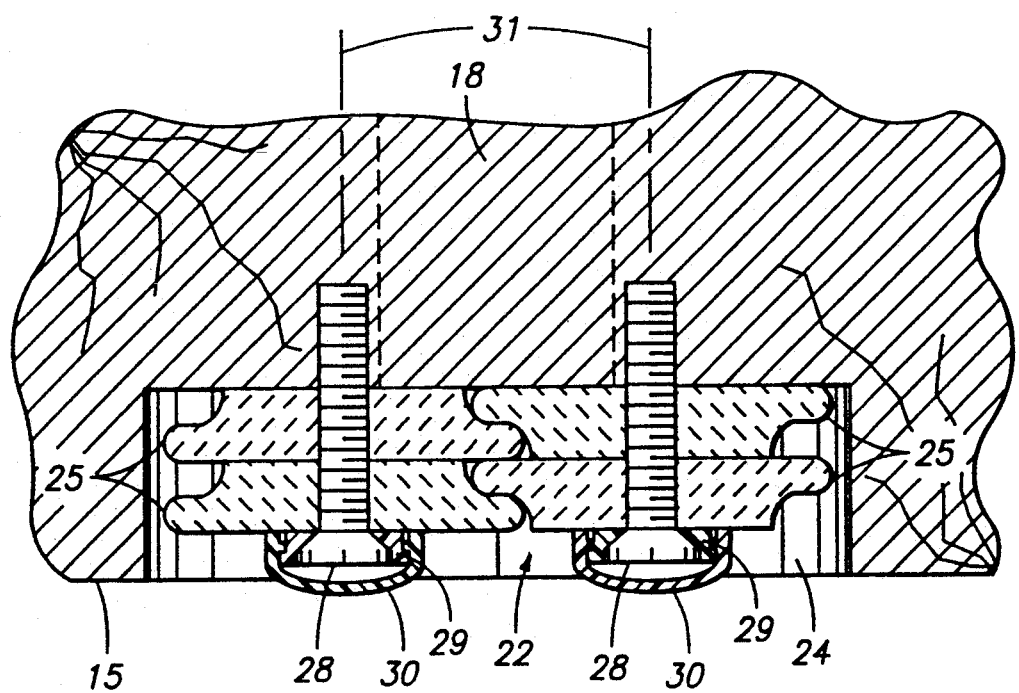
FIG. 6 is an enlarged sectional view taken along line 6—6 in FIG. 4.
Figure 11:
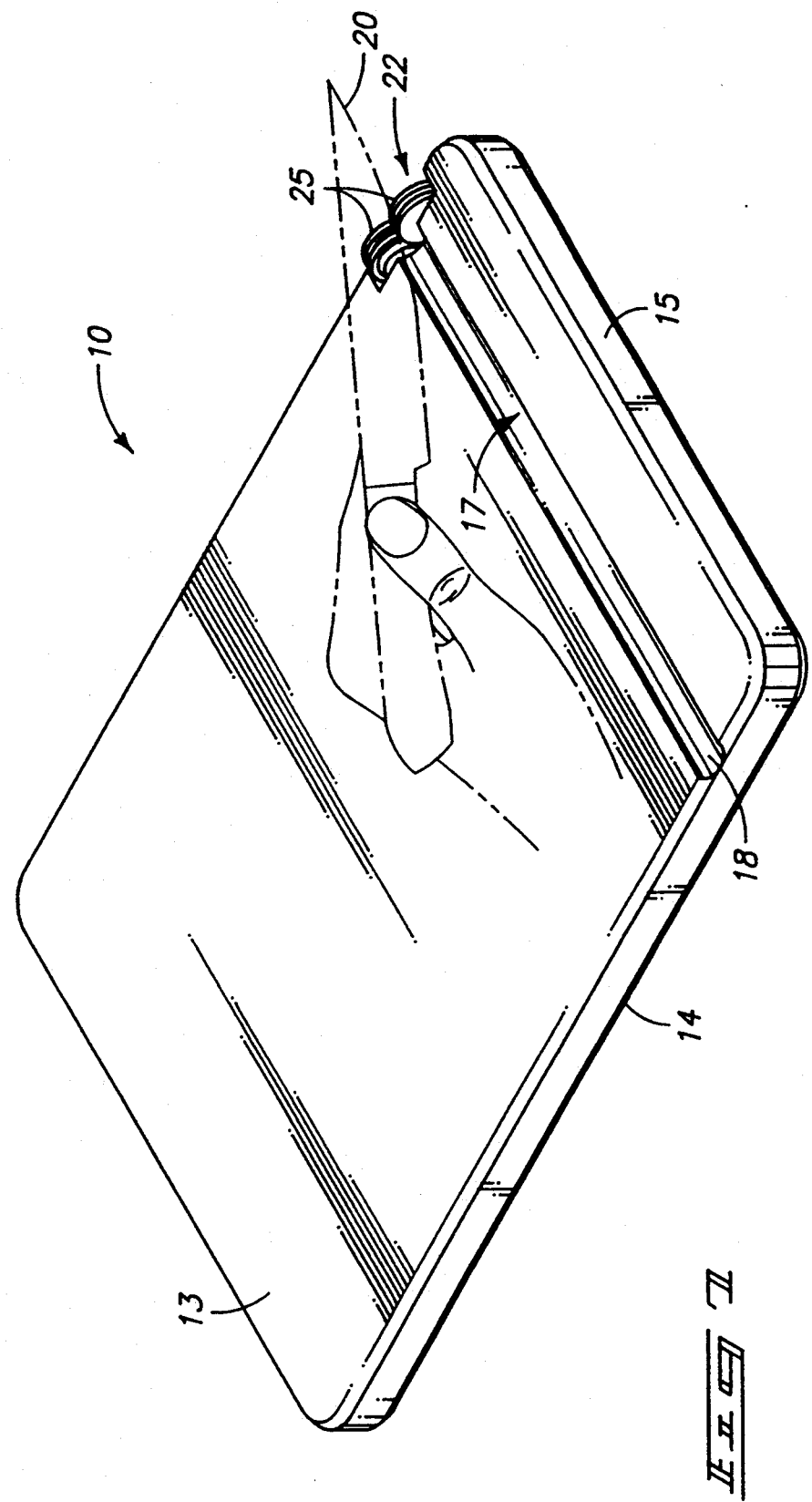

Sharpening means 22 is shown in general in FIGS. 1 and 2, and in detail in FIGS. 4–6. The sharpening means 22 is shown in operation at FIG. 7.

Sharpening means 22 is provided with the board 10 adjacent the peripheral edge 15 and in a particular spatial relationship with respect to the groove 17.

In the first preferred form, sharpening means 22 is received within a sharpening means receiving recess 24 that is formed into the board 10 along the peripheral edge 15. The recess 24 is formed sufficiently deep into the board from the edge 15 (FIGS. 5, 6) to receive the sharpening means in order to protect the sharpening elements against damage while maintaining the elements at a preferred exposed orientation for ease of access.

Figure 3:
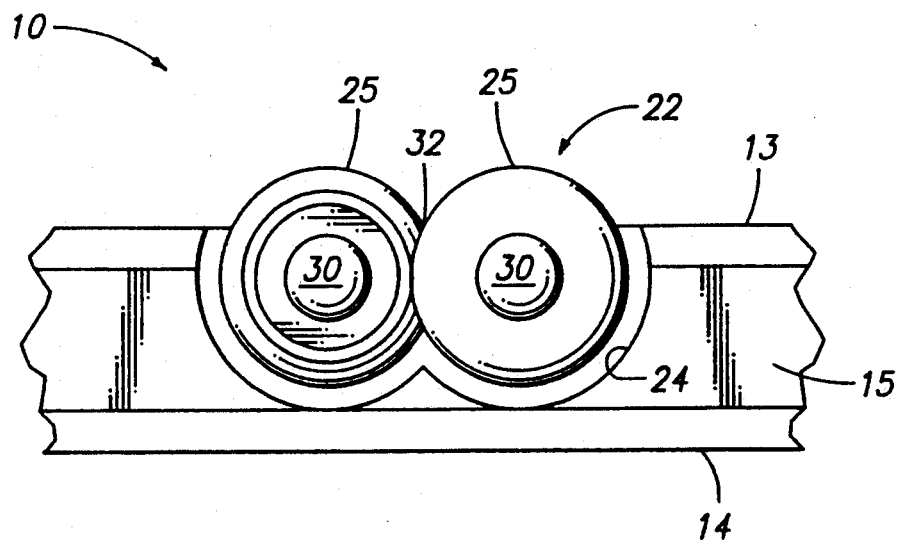
FIG. 3 is an enlarged fragmented side elevation view of a first preferred knife sharpening elements of the present knife sharpening cutting board.

Sharpening means 22 is advantageously comprised of at least one pair of sharpening disks 25 that are rotatably mounted to the board 10. The disks 25 overlap one another radially as shown in FIGS. 3 and 4, defining an intersection 32 (FIG. 4) for receiving and sharpening knife edges.

In a preferred form, two pairs of identical disks 25 are provided, overlapping as described above. The configuration of the disks is preferably that shown in FIGS. 5 and 6, with fluted peripheral edge configurations. By reversing the disks on opposite sides, the edge configurations are made to overlap and nest together as shown in FIG. 6. This somewhat interlocked configuration assures appropriate radial positioning of the disks relative to one another and assures a consistent position for the intersection 32 and its sharpening angles during use.

The disks are preferably formed of an abrasive ceramic material. Disks having the described configuration and formed of appropriate ceramic materials are distributed by McGowan Manufacturing of Hutchinson, Minn. 55350.

The disks 25 are rotatably secured to the board 10 by mounting screws 28. The screws 28 define rotational axes 31 (FIGS. 5, 6) for the disks 25. In the preferred form, the axes 31 are spaced to opposite sides of the groove 17. It is also advantageous that the axes 31 be parallel to one another, and to the top planar surface 13 of the board 10 (FIG. 5). The screws 28 may be selectively turned to set the disks against the inner surfaces of the recess 24 and thereby adjust the resistance to rotation for the disks.

It is significant to note, with reference to FIG. 4, that the intersection 32 between the sets of disks 25 is in alignment with the groove 17. In fact, the intersection 32 is advantageously centered on the groove 17 as shown, and is situated adjacent to the plane of the board top surface 13.

It is advantageous that the intersection 32 be situated slightly below the top surface 13 and into the groove 17 to minimize exposure of the disk surfaces above the top board surface 13. This reduces the chances for the disks to be damaged during use by allowing the material of the board to substantially enclose and protect the brittle disk materials.

Appropriate washers 29 and screw caps 30 are provided over the headed ends of the screws 28 to facilitate rotation of the disks and to visually obscure the screw heads for ornamental purposes.

The washers 29 are provided between the screw heads and disks, to the outside surfaces thereof. The innermost surfaces of the disks (FIGS. 5, 6) simply slide against the innermost surface of the recess 24.

The screws 28 are threadably received in bores formed in the board and have their axes 31 situated in a plane parallel to and at approximately 7 mm from the top surface 13. With this distance, and disks 25 having a common radius of approximately 13.3 mm, the intersection 32 is situated approximately 5.1 mm from the plane passing through the screw axes 31. The intersection 32 is therefore situated within the concavity of the groove 17 and just slightly below the plane of the top surface 13.

With the above disk dimensions and the complimentary dimensions of the recess 24 formed in board, the disks are substantially contained within and protected by the material of the board. The outer disk surfaces are protected by the peripheral board edge 15, and the bottom edges of the disks, located within the recess 24 above the bottom of the board, are protected by the overlapping portions of board bottom surface 14.

The screws 28 and caps 30 may be removed using ordinary tools to facilitate cleaning of the board and sharpening disks 25. Disk cleaning may be easily accomplished using common toothpaste as a cleaning material.

Operation of the knife sharpening cutting board is accomplished in an easy and effective manner. The board is placed on an appropriate support surface and is used in the normal manner as an ordinary cutting board. When it is desired to sharpen a knife, the knife blade 20 is simply drawn across the board with the cutting edge of the blade sliding between the disks 25 at the intersection 32. The blade is drawn along the length of the groove and, due to the depth of the groove, will clear the board and therefore will not score or cut the board unnecessarily. Sharpness is typically obtained in a few strokes of the blade across the disks. Once sharpened, the knife can be used for further cutting operations.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrin of equivalents.

I claim:

1. A cutting board and knife sharpener, comprising:
    a board, having a top surface and a peripheral edge;
    knife sharpening means mounted to the board adjacent the peripheral edge; and
    a groove formed into the board leading to the knife sharpening means for receiving a knife blade;
    wherein the board includes a recess formed into the peripheral edge and opening along the top surface; and
    wherein the knife sharpening means is comprised of at least one pair of sharpener disks mounted to the board within the recess inwardly adjacent the peripheral board edge.

2. A cutting board and knife sharpener as claimed by claim 1
    wherein the sharpener disks are mounted for rotation about substantially parallel rotational axes, said disks having circumferential edges in radially overlapping relation.

3. A cutting board and knife sharpener as claimed by claim 1, wherein the groove is formed as a concave surface in the board and the sharpener disks are mounted for rotation about substantially parallel rotational axes, said disks having circumferential edges in radially overlapping relation; the circumferential edges intersecting along an axis which is substantially centered in relation to the concave surface forming the groove.

4. A cutting board and knife sharpener as claimed by claim 1, wherein the top surface of the board is substantially planar and wherein the pair of sharpener disks are mounted for rotation about rotational axes which are substantially parallel to the planar top surface of the board.

5. A cutting board and knife sharpener as claimed by claim 1, wherein the pair of sharpener disks are mounted for rotation about substantially parallel rotational axes, said disks having circumferential edges in radially overlapping relation; the circumferential edges intersecting along an axis which is aligned with the groove.

6. A cutting board and knife sharpener as claimed by claim 1, wherein the board includes a bottom surface opposite the top surface and wherein the pair of sharpener disks are mounted for rotation about rotational axes, said disks having circumferential edges in radially overlapping relation; the circumferential edges intersecting along an axis which is aligned with the groove and which is adjacent the top surface and between the top and bottom surfaces of the board.

7. A cutting board and knife sharpener as claimed by claim 1, wherein the board includes a bottom surface that is opposite the top surface; wherein the recess is open along the peripheral edge and top surface of the board, and adjoins the groove such that the knife sharpening disks are situated at one end of the groove;

wherein the knife sharpener disks are mounted such that the peripheral edge and bottom surface of the board project beyond the sharpener disks to protect the disks, and with the disks projecting above the top surface; and wherein the disks are mounted for rotation about rotational axes, said disks having circumferential edges in radially overlapping relation; the circumferential edges intersecting along an axis which is aligned with the groove and situated between the top and bottom surfaces of the board.

8. A cutting board and knife sharpener as claimed by claim 1, wherein the knife sharpening means is comprised of two pairs of ceramic sharpener disks mounted to the board within the sharpener receiving recess inwardly adjacent the peripheral board edge for rotation about rotational axes; the sharpener disks radially overlapping one another, wherein the circumferential edges intersect along an axis which is aligned with the groove.

* * * * *